(12) United States Patent
Wolter et al.

(10) Patent No.: US 7,881,455 B2
(45) Date of Patent: Feb. 1, 2011

(54) APPARATUS AND METHOD FOR FINDING A CALLED PARTY OVER A TELECOMMUNICATION NETWORK

(75) Inventors: David R. Wolter, Austin, TX (US); Anil Doradla, Austin, TX (US); Sreenivasa Gorti, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1269 days.

(21) Appl. No.: 11/331,396

(22) Filed: Jan. 12, 2006

(65) Prior Publication Data

US 2007/0165833 A1 Jul. 19, 2007

(51) Int. Cl.
*H04M 1/274* (2006.01)

(52) U.S. Cl. ........... 379/355.02; 370/254; 370/351; 370/352; 370/356; 379/88.19; 379/93.23; 455/461; 709/201; 709/219; 709/220

(58) Field of Classification Search ........... 379/211.03, 379/211.04, 212.01, 214.01, 88.19, 100.01, 379/201.01, 201.02, 209.01, 211.01, 355.01, 379/355.02, 93.23; 370/401, 254, 351, 352, 370/356; 455/445, 517, 461; 709/201, 219, 709/220

See application file for complete search history.

(56) References Cited

U.S. PATENT DOCUMENTS

| | | |
|---|---|---|
| 4,400,587 A | 8/1983 | Taylor et al. |
| 4,475,009 A | 10/1984 | Rais et al. |
| 4,809,321 A | 2/1989 | Morganstein et al. |
| 4,885,780 A | 12/1989 | Gopal et al. |
| 4,930,151 A | 5/1990 | Walton et al. |
| 5,023,868 A | 6/1991 | Davidson et al. |
| 5,027,384 A | 6/1991 | Morganstein |
| 5,029,196 A | 7/1991 | Morganstein |
| 5,802,160 A * | 9/1998 | Kugell et al. ........... 379/211.04 |
| 5,982,870 A | 11/1999 | Pershan et al. |
| 6,275,577 B1 * | 8/2001 | Jackson .................. 379/211.01 |
| 6,304,649 B1 * | 10/2001 | Lauzon et al. ......... 379/211.01 |
| 6,516,060 B1 * | 2/2003 | Foladare et al. ........ 379/211.03 |
| 6,584,317 B2 * | 6/2003 | Mukerjee et al. ........... 455/445 |
| 6,658,455 B1 * | 12/2003 | Weinman, Jr. .............. 709/203 |
| 6,690,675 B1 * | 2/2004 | Kung et al. ................. 370/401 |
| 6,697,478 B1 * | 2/2004 | Meldrum et al. ....... 379/211.04 |
| 6,721,412 B1 * | 4/2004 | Youngs .................. 379/204.01 |
| 6,769,020 B2 * | 7/2004 | Miyazaki et al. ............ 709/219 |
| 7,042,871 B2 * | 5/2006 | Gallant et al. ............... 370/352 |
| 7,136,466 B1 * | 11/2006 | Gao ........................ 379/93.23 |
| 7,139,378 B2 * | 11/2006 | Kreten et al. .......... 379/201.02 |
| 7,194,080 B2 * | 3/2007 | Worsham et al. ....... 379/211.03 |
| 7,283,833 B2 * | 10/2007 | Fukui et al. ................. 455/517 |
| 7,305,079 B1 * | 12/2007 | Forte ..................... 379/211.01 |
| 7,440,561 B2 * | 10/2008 | Forte ..................... 379/201.01 |
| 7,672,440 B2 * | 3/2010 | Chen et al. ............. 379/209.01 |
| 7,680,256 B2 * | 3/2010 | McLarty et al. ........ 379/100.01 |
| 7,697,506 B2 * | 4/2010 | Narin et al. ................. 370/352 |
| 2001/0023428 A1 * | 9/2001 | Miyazaki et al. ............ 709/201 |

(Continued)

*Primary Examiner*—Gerald Gauthier
(74) *Attorney, Agent, or Firm*—Jackson Walker L.L.P.

(57) ABSTRACT

The present disclosure provides a system and method for establishing telephone communication between a calling party and called party wherein the calling party may store a plurality of numbers or identifiers of a called party and initiating a number or identifier of the called party enables the system and method to call multiple numbers of the called party from the stored plurality of numbers.

12 Claims, 5 Drawing Sheets

U.S. PATENT DOCUMENTS

| | | | |
|---|---|---|---|
| 2006/0104430 A1* | 5/2006 | Kirkland et al. | 379/211.04 |
| 2006/0251229 A1* | 11/2006 | Gorti et al. | 379/142.02 |
| 2007/0042791 A1* | 2/2007 | Walter | 455/461 |
| 2007/0070976 A1* | 3/2007 | Mussman et al. | 370/351 |
| 2007/0097879 A1* | 5/2007 | Bleckert et al. | 370/254 |
| 2007/0121584 A1* | 5/2007 | Qiu et al. | 370/352 |
| 2007/0121607 A1* | 5/2007 | Gao | 370/356 |
| 2007/0165833 A1* | 7/2007 | Wolter et al. | 379/355.02 |
| 2007/0189500 A1* | 8/2007 | Stanford | 379/355.01 |
| 2007/0211702 A1* | 9/2007 | Doradla et al. | 370/356 |
| 2009/0222457 A1* | 9/2009 | Gallant | 707/10 |
| 2009/0285204 A1* | 11/2009 | Gallant et al. | 370/352 |
| 2010/0138520 A1* | 6/2010 | Gallant | 709/220 |

* cited by examiner

APPARATUS AND METHOD FOR FINDING A CALLED PARTY OVER A TELECOMMUNICATION NETWORK

BACKGROUND OF THE DISCLOSURE

1. Field of the Disclosure

This disclosure relates to the telecommunication networks that provide telephone services.

2. Description of the Related Art

Service providers, such as telephone companies and Internet service providers provide telephone services that include call redirecting or call forwarding features. More recently, service providers also have started to offer services where a first party may specify multiple destinations (e.g. telephone numbers, SIP URIs, etc.) of the first party. When another party (second party) calls the first party, the network dials or calls the various numbers in some order until the first party answers a call or until all of the numbers have been dialed. However, many of the telephone service subscribers do not use or have such features. Thus, if there is no answer (i.e. a certain number of ring tones have occurred) when a calling party typically calls a first number of a called party, the calling party hangs up and calls the next number, typically by manually looking through a list of numbers stored in a telephone, a computer memory, etc. Thus, it is considered desirable to have a system, device, and method that enables the calling party to more efficiently call multiple numbers of a called party.

BRIEF DESCRIPTION OF THE DRAWINGS

For detailed understanding of the present invention, references should be made to the following detailed description of an exemplary embodiment, taken in conjunction with the accompanying drawings, in which like elements have been given like numerals, wherein.

DETAILED DESCRIPTION OF THE EMBODIMENTS

Figure 1:
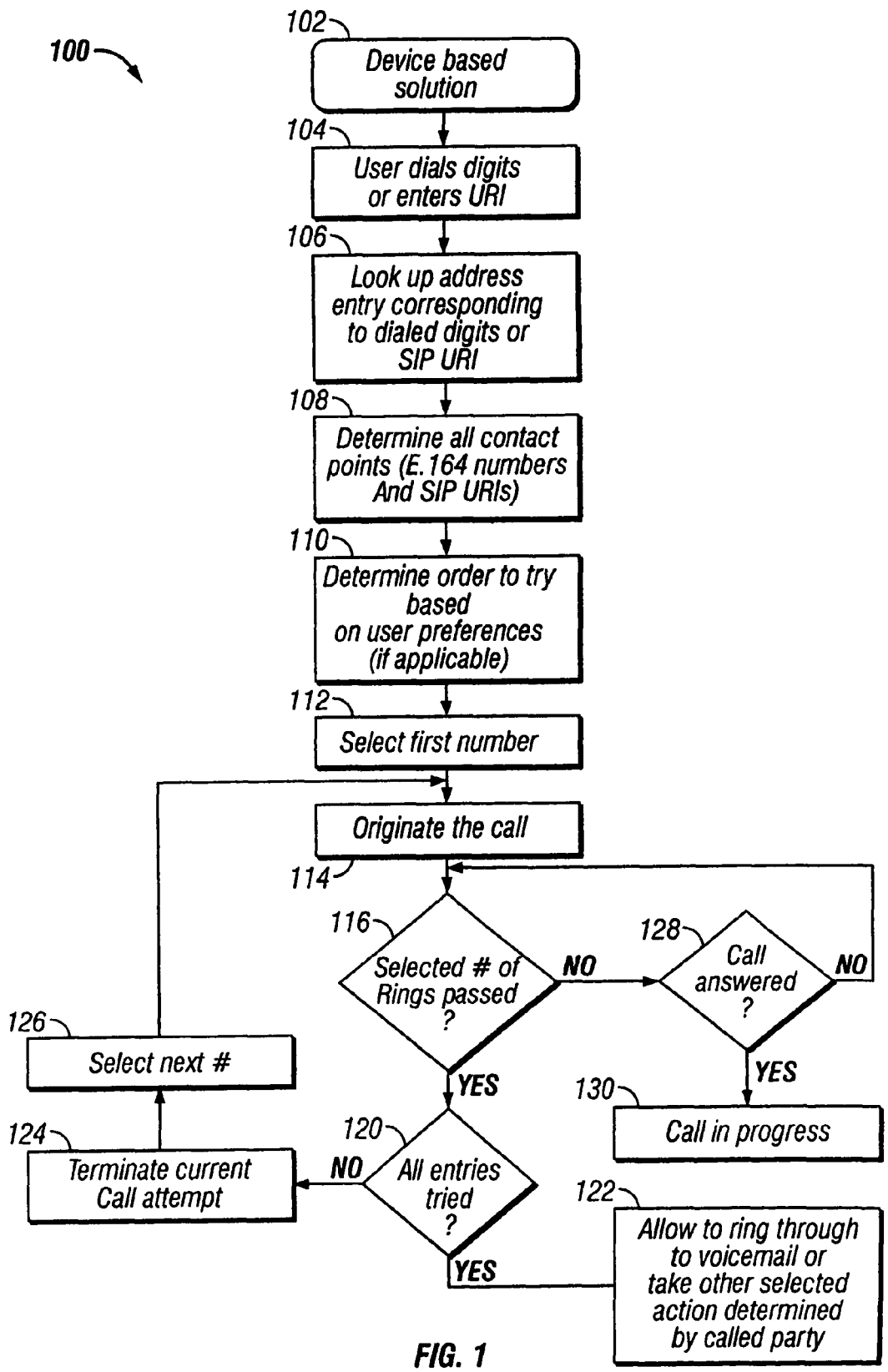
FIG. 1 is a flow chart that shows an exemplary method of placing multiple calls to a called party by utilizing a device configured therefore, according to one embodiment of the present disclosure.

The present disclosure provides a method, apparatus, and system for establishing a communication between a calling party and a called party over one or more communications networks.

In one aspect, the present disclosure provides a user or calling party a telecommunication device, method, and system to program multiple destination numbers of a called party into a memory of a device or a network database and enables the user to follow or reach the called party programmed numbers by inputting or dialing a single number or another called party identifier.

In another aspect, the present disclosure provides a computer readable medium that includes a computer program which is accessible to a processor for executing instructions contained in the computer program. The computer program may include instructions to receive a plurality of numbers from a calling party relating to a called party; instructions to receive an identifier relating to the called party; instructions to place a call to a first number in the plurality of numbers; and instructions to place a call to a second number in the plurality of numbers when the first number does not respond in accordance with a selected criteria, such as a selected number of ring tones or selected time period.

The computer program further includes instructions to continue to place a call to each number in the plurality of numbers if the immediately preceding called number does not respond within a certain number of ring tones. The computer program further includes instructions to place a call to each number in the plurality of numbers, when a criteria is met, such as upon occurrence of a selected number of ring tones or upon the lapse of a selected time period. The computer program further may include instructions to place the calls in an order that is preselected by the calling party. In another aspect, the computer program may include instructions to place the calls to each number in the plurality or a subset of numbers substantially simultaneously.

In another aspect, the present disclosure provides a method for establishing telephone communication between a calling party and a called party by following multiple numbers of the called party previously specified by the calling party. In one aspect, the method comprises: storing a plurality of numbers of a called party, received from a calling party; receiving from the calling party an identifier of the called party; placing a call to a first number in the plurality of numbers in response to the identifier; and placing a call to at least a second number in the plurality of numbers after a selected number of ring tones at the first number. The identifier may be the first number in the plurality of numbers or a Session Initiation Protocol (SIP) or any other Uniform Resource identifier (URI). The method further provides calling each number in the plurality of numbers until the call is answered. The calls may be placed in an order that is pre-selected by the calling party. If no called number responds, the method allows a call to ring though to a voice mail, if available.

In yet another aspect, the present disclosure provides a system that includes a database that stores a plurality of numbers for a called party provided by a calling party; a processor having access to the database; a computer readable medium accessible to the processor to execute instructions contained in a computer program embedded in the computer readable medium. The computer program includes instructions to receive a plurality of numbers from a calling party relating to a called party; instructions to receive an identifier relating to the called party; instructions to place a call to a first number in the plurality of numbers; and instructions to place a call to a second number in the plurality of numbers if the first number does not respond within a certain number of ring tones.

The present disclosure also provides an apparatus for placing a telephone call. The apparatus includes a memory for storing a plurality of numbers of a called party; an interface that enables a user to input an identifier for the called party; a processor that initiates a call to a first number in the plurality of numbers upon receiving the identifier for the called party and initiates a call to at least a second number in the plurality of numbers automatically after a selected number of ring tones have occurred corresponding to the first number. The processor initiates a call to each number in the plurality of numbers. The processor may be programmed to initiate calls to the plurality of numbers substantially simultaneously.

FIG. 1 depicts a flow chart that shows a device-based method 100 for placing telephone calls according to one embodiment of the present disclosure. In the method 100, a user device 102 performs various aspects of the method. When a user or a calling party wishes to call a telephone or another device of another party (the called party), the user dials or inputs certain digits or a user required input (URI), such as a telephone number or another identifier relating to the called party (see block 104). This could also be implemented by selecting a name or number on a device based address/phone book. The device 102 may be any device used for calling, such as a telephone, personal digital assistant (PDA), computer, etc.

The device 102 then looks up an address entry corresponding to the dialed digits or SIP URI as shown in block 106. The address entries for the called party are pre-stored by the user in a memory associated with the device 102, as shown in block 106. The device then determines all contact points, such as E.164 numbers and (standard international telephone numbering scheme) and SIPs URIs that are stored in the memory of the device 102. The numbers may be in the form of a look-up table, an address book application, or any other suitable format. An order of calling is then determined (block 110), which may be predefined by the user. For example, the user may define an order among several telephone numbers of the called party, such as numbers of a mobile telephone, home telephone, Voice-over-Internet (VoIP) address, work telephone, car telephone, satellite telephone, etc. If an order is specified, the call is made to the first number in the order, as shown in block 112. If no order or preference is specified, the calls may be placed in any order or in the order the numbers are placed in the memory or as they appear in the look-up table. Block 114 shows the device 102 originating or placing the first call to the called party. If there is no response in accordance with a selected rule or criteria such as a selected number of rings or time period, as shown by the block 116, the device 102 terminates the first call (block 124) and automatically places the call to the second number of the called party (block 126). If the second number does not respond, the device then calls the next number on the list of numbers (see block 126) and continues the process as described above until the call is answered or that all the numbers have been tried, as shown in block 120. If all the numbers have been tried, the device may enable the last call to ring through to a voicemail associated with the last number or take another action selected or determined by the calling party as shown in block 122. Alternatively, if the device may be made and programmed to establish multiple connections, and thus place the calls simultaneously.

If a call to any number of the called party is answered (as shown in block 128), the device establishes a two way communication between the device and a device of the called party, as shown in block 130. This device-based method enables the user to store multiple contact numbers of any number of parties and specify the order of placing the calls and dials multiple numbers of a called party upon receiving a single number of the called party.

Figure 2:
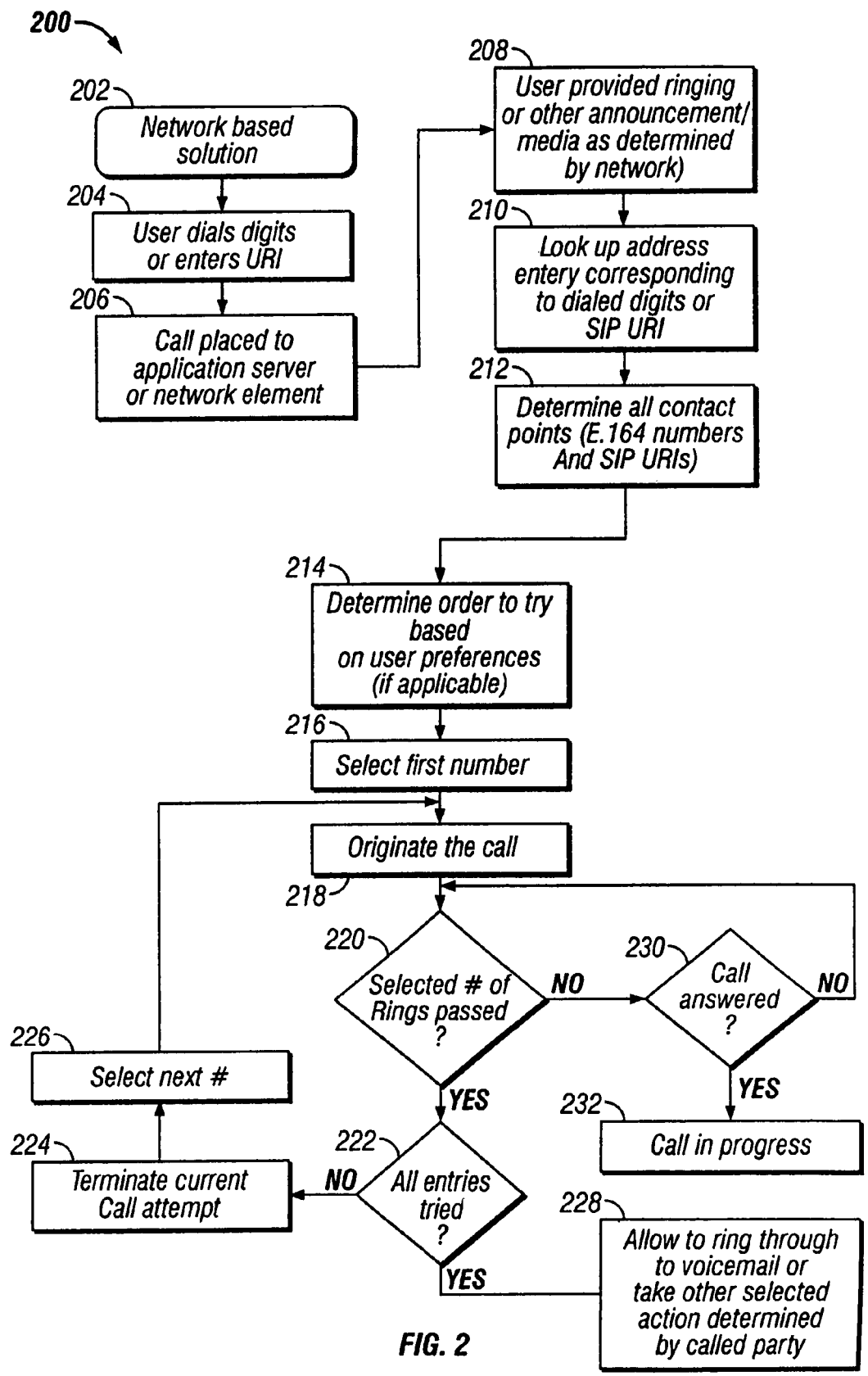
FIG. 2 is a flow chart that shows an exemplary method for placing multiple calls to a called party through a network system, according to an embodiment of the present disclosure.

FIG. 2 depicts a flow chart 200 that shows a network-based method 202 of establishing a communication between a calling party and a called party. In the method 200, the multiple numbers of user-defined parties are stored in a database at a network database accessible to a server. The user may input the numbers of various parties to be stored via any suitable method, such as via a telephone, a PDA, a computer over the Internet, or via a service provider personnel. The called party contact numbers may be stored in an address book form, each contact person having an associated look-up table with a pre-selected priority order. When a user or calling party wishes to call one such called party, the calling party may enter an identifier (block 204) associated with the called party via any suitable device, such as a telephone, PDA, computer, etc. The identifier may be a telephone number, a SIP address, or a URI. The dialed identifier is received by a server at the network, as shown in block 206. The server recognizes or identifies that the call is originating from a particular calling party for a particular calling party, as shown in block 208. The server may make such a determination based on programmed instructions. The server then looks up the stored information about the called party, such as a look-up address table entries that correspond to the called party, dialed digits, SIP URI, or other identifiers, as depicted in block 210. The server then determines all the contact points (block 212) and the order in which the calls are to be placed (block 214), which may be pre-selected or pre-defined by the calling party. If no order is specified, the server may place the call in any order or in the order in which the multiple numbers of the called party appear in the look-up address table, etc. The server then selects a first number (block 216) and originates the call to the selected number (block 218). If the first number does not answer during a selected number of ring tones (or specified time duration), the network server then calls the next number and so on in the same manner as described with respect to FIG. 1 and shown in blocks 220, 222, 226, 228, 230, and 232. Alternatively, these calls could be placed simultaneously.

Figure 3:
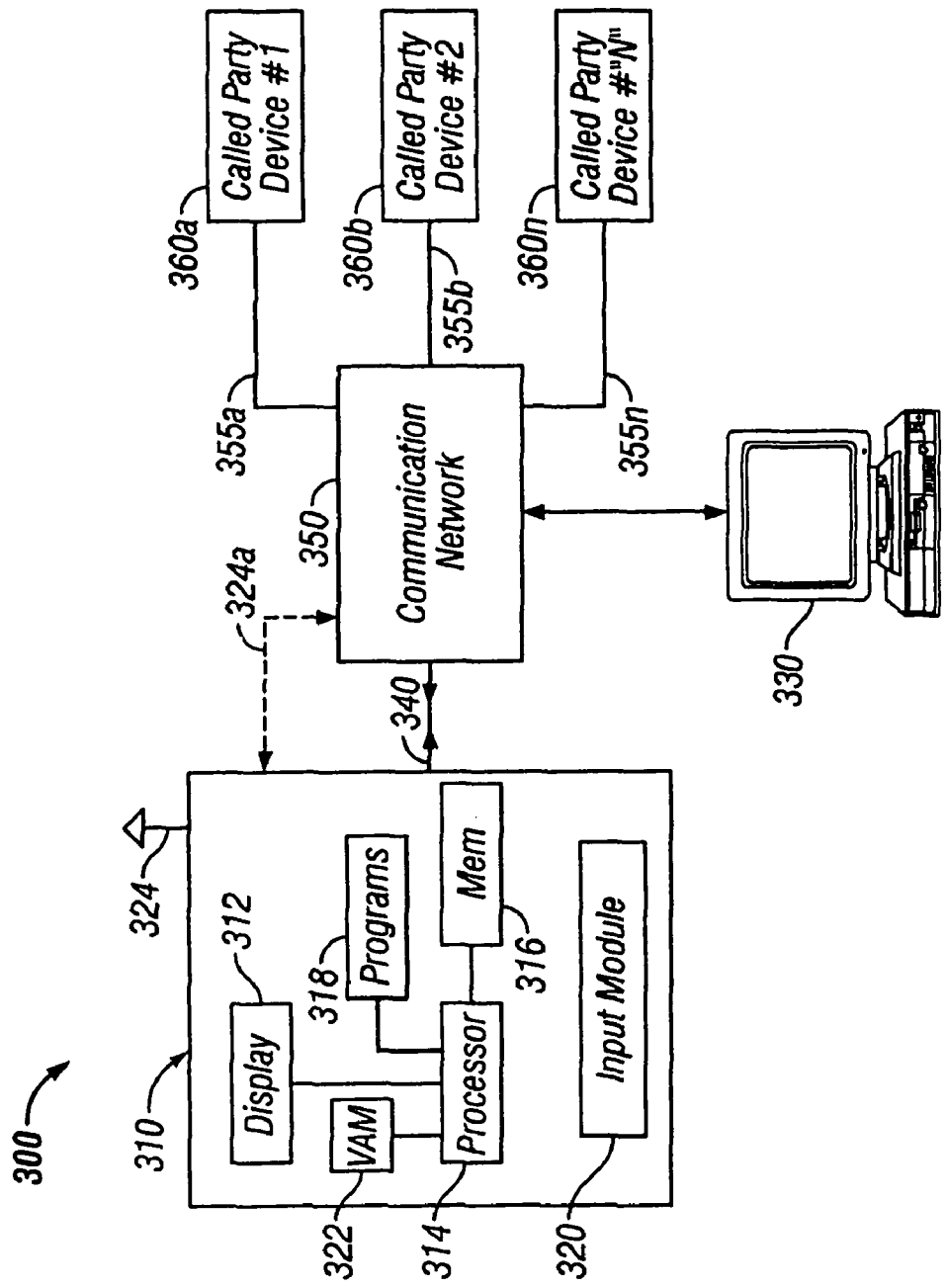
FIG. 3 shows a functional block diagram of a device according to an embodiment of the present disclosure.

FIG. 3 shows a device-based system 300 that may be utilized for executing the methods according to one embodiment of the present disclosure. The system 300 includes an intelligent device, such as a telephone, PDA 310 or a computer, such as 320. The device 310 includes a display 312, a processor 314, a memory 316, and computer programs 318 accessible to the processor 314. The user utilizes a data input module unit 320, which may be a keyboard or a voice recognition module 322, to store information relating to the called parties in the memory 316. Alternatively, the data may be populated by another application which, for example, synchronizes a network based address book to an address book/ data table in the user device. The called party information may include a unique identifier for each called party and one or more additional numbers. The identifier may be a first telephone number of a called party or an SIP address associated with the called party. For example, the SIP address may be an Internet Protocol address or another identifier, which when initiated at the device 310 will be recognized by the data stored in the memory 316. In one aspect, the device 310 may be a wireless device that has an antenna 324, wherein the device 310 may communicate with the network 350 via a wireless connection 324a. In an alternative aspect, the device 310 may be a land-line device, such as land line telephone that communicates with the network 350 with a link 340, which may be a copper wire or an optical fiber connection.

The device used may also be a computer 330 that can perform the functions described herein. The device (310 or 330) enables a user to create a database for each called party, wherein each called party has an identifier, i.e. a unique number or an SIP address, etc. The user may store multiple numbers for each called party and specify a preference or order in which to execute such numbers. When a calling party dials a number of a called party or inputs another suitable identifier, the device 310 sends a signal to the network 350, which may be a wireless telephone network, a public switched telephone network or a Voice over Internet Protocol (VoIP) network. The processor 314 in the device 310 recognizes the identifier and looks up the multiple numbers stored for the called party and selects a first number for the called party based on the user defined preference, if any, and initiates or dials the first selected number. If no preference or order is specified, the program 318 may include instructions that enable the processor to dial the numbers in any order or in the order stored. The stored numbers may be in the form of a look-up table or any other suitable format. If there is no answer at the first number, i.e., a certain number of ring tones have occurred (or a specified time duration has passed), the program includes instructions to cause the processor to terminate the call and automatically initiate a call to a second number and so on until a call is answered or all the numbers stored for the called party have been called. The program 318 may include instructions that enable the processor to allow the last call or any other call ring until it goes into a voice mail, or to terminate the call after a certain number of rings have occurred. Alternatively, if the device is capable of multiple connections, these numbers may be tried simultaneously instead of sequentially. In this aspect, the first to complete the connection is passed to the user, while the other call attempts are terminated.

Figure 4:
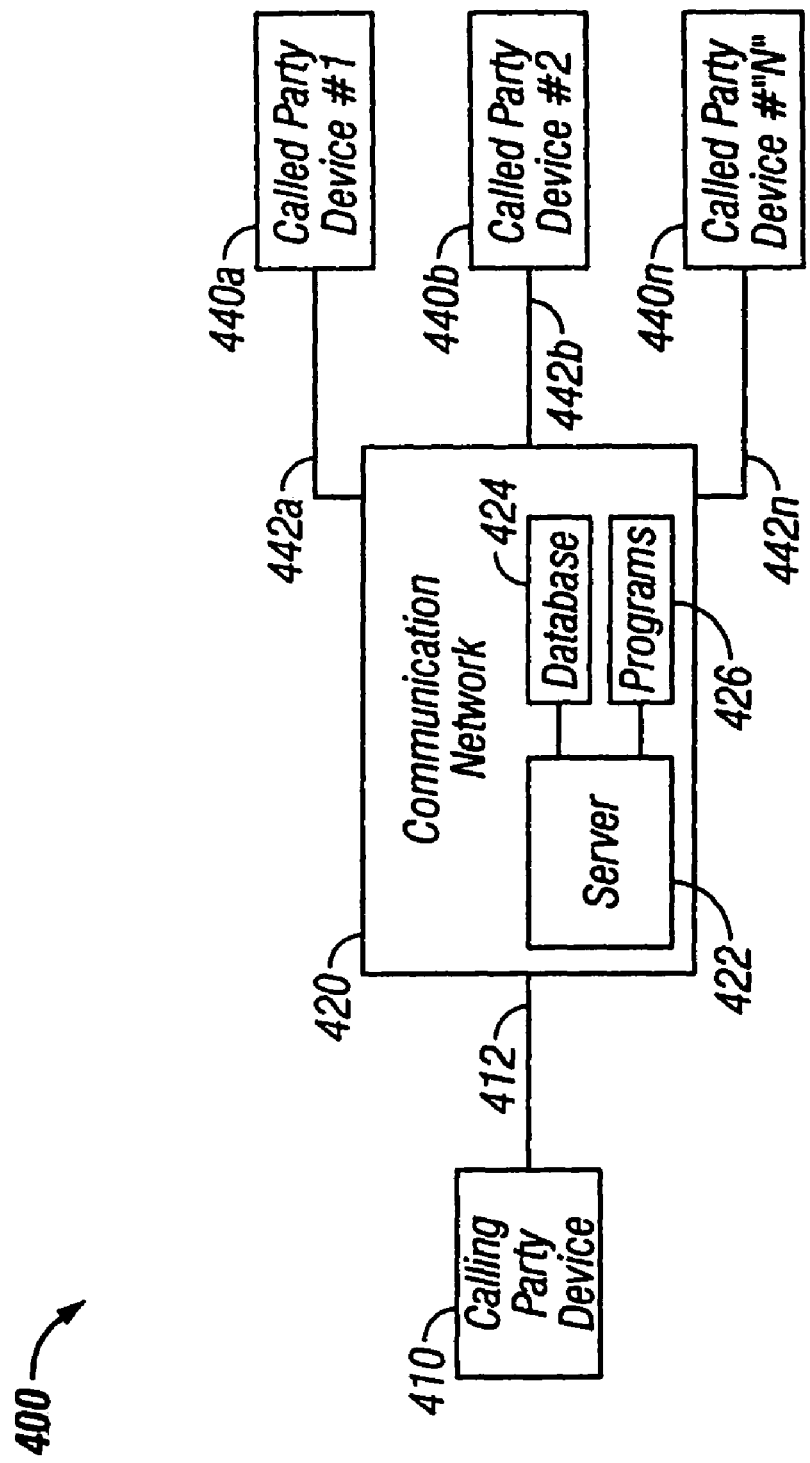
FIG. 4 shows a network system for placing multiple calls to a called party according to an embodiment of the present disclosure.

FIG. 4 shows a diagram of a network-based system 400 for establishing communication between a calling party device 410 and multiple called party devices 440a-440n via a communication networks 420. The system 400 is shown to include a communications network 420, which may be a PSTN, wireless network, VoIP or any combination thereof. The network 420 includes an interface server 422 that has an associated database 424 for storing user (calling party) initiated information about multiple called parties and computer programs 426 that contain instructions that are executed by the server to execute the methodologies and other functions described herein.

In the system 400, a calling party may subscribe to a service provided by the service provider that enables the calling party to store an identifier for multiple called parties and multiple contact numbers for each such called party. The calling party may store such information by using any suitable device, such as a telephone, a computer over the Internet, etc., in a manner similar to as described in reference to FIGS. 1-3 above. In the system 400, when a calling party initiates an identifier for a called party, the identifier is received by the server via line 412 and recognized as being associated with a particular called party, such as called party 440. The server 422 then looks at the address entry corresponding to the called party identifier in the database 424 and selects a first number to be called, which, may be for any of the called party devices 440a-440n shown in FIG. 4. The server then utilizing the instructions contained in the computer program 426, initiates the call to the first number and, if there is no answer within a selected number of ring tones (or specified time duration), terminates the call to the first number and initiates a call to a second number, etc., until all the numbers have been called or the call has been sent to a voice mail box as described above with respect to FIGS. 1-3.

Figure 5:
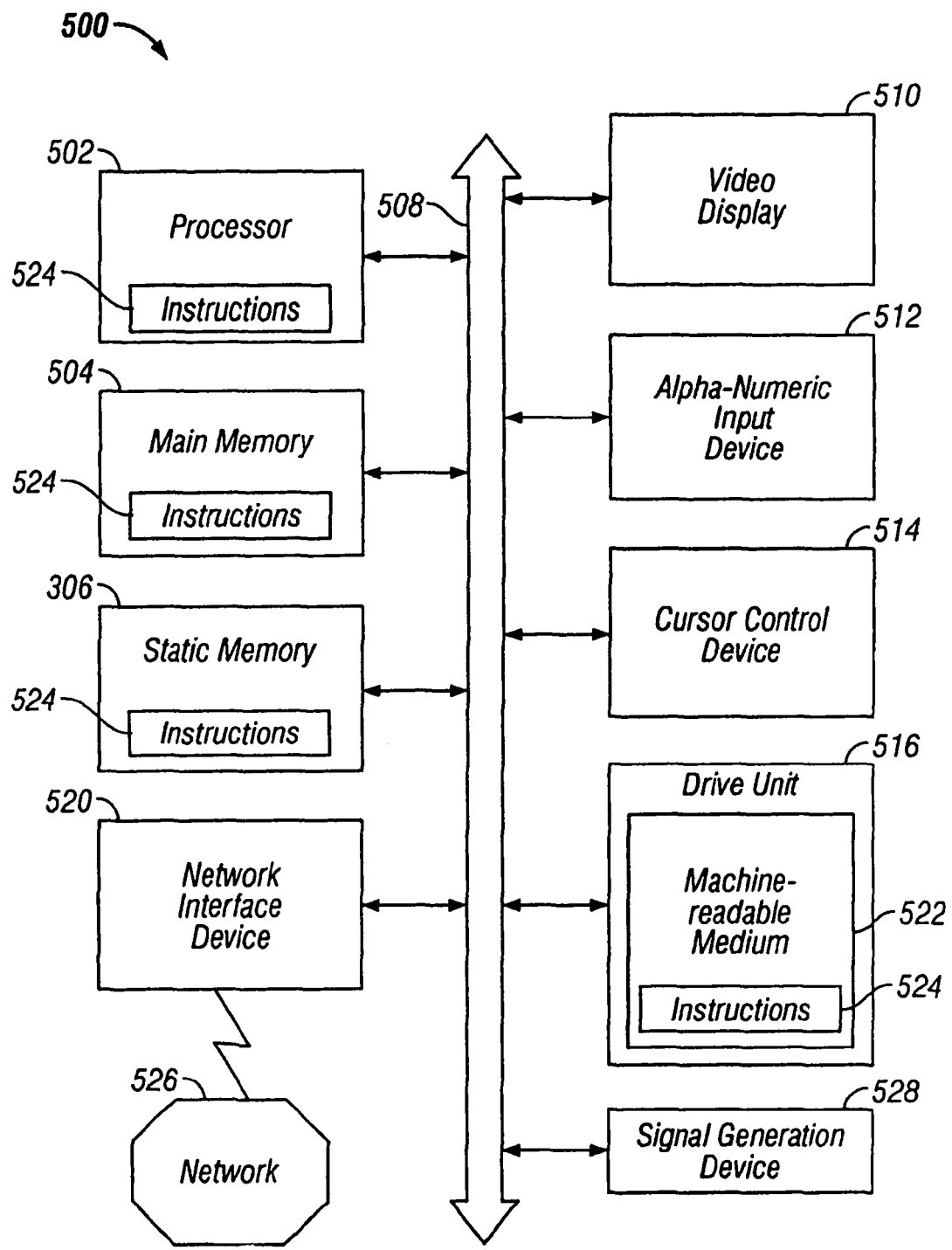
FIG. 5 is a diagrammatic representation of a machine in the form of a computer system within which a set of instructions, when executed, may cause the machine to perform any one or more of the methodologies discussed herein.

FIG. 5 is a diagrammatic representation of a machine in the form of a computer system 500 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, or a switch or bridge. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU), or both), a main memory 504 and a static memory 506, which communicate with each other via a bus 508. The computer system 500 may further include a video display unit 55 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated in herein above. The instructions 524 may also reside, completely or at least partially, within the main memory 504, the static memory 506, and/or within the processor 502 during execution thereof by the computer system 500. The main memory 504 and the processor 502 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 524. The instructions 524 may be transmitted or received over a network 526 via the network interface device medium 522. The term "machine-readable medium" should be taken to include a single medium or multiple media (e.g., a centralized or distributed database, and/or associated caches and servers) that store the one or more sets of instructions. The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the invention is considered to include any machine-readable medium including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A non-transitory computer readable medium having computer program instructions, executable by a processor, the instructions comprising:

a set of instructions to receive a plurality of numbers from a calling party relating to a called party, the plurality of numbers including a session initiation protocol (SIP) compliant, uniform resource indicator (URI); and a set of instructions to place non-simultaneous calls to at least some of the plurality of numbers according to a pre-selected order of calling, including:
a set of instructions to place a call to a first number in the plurality of numbers; and
a set of instructions to place a call to a second number in the plurality of numbers when the call to the first number goes unanswered according to a predetermined criteria.

2. The computer readable medium of claim 1, wherein the predetermined criteria are selected from a group consisting of a selected number of ring tones and a time period.

3. The computer readable medium of claim 1, further comprising a set of instructions to establish a communication between the calling party and the called party at one of the plurality of numbers.

4. A method of providing a telephone service, comprising:
receiving a plurality of numbers associated with a called party;
receiving a uniform resource identifier (URI) associated with the called party;
placing non-simultaneous calls to at least some of the plurality of numbers, including:
placing a call to a first number in the plurality of numbers in response to receiving the identifier;
placing a call to a second number in the plurality of numbers when the first call is unanswered according to a criteria.

5. The method of claim 4 further comprising placing a call to each number in the plurality of numbers non-simultaneously, according to a predetermined order until the call is answered.

6. The method of claim 5, further comprising allowing a call to ring through to a voice mail.

7. The method of claim 4, wherein the criteria is based on at least one of a number of rings and a time period.

8. A system comprising:
a processor having access to a database that stores a plurality of numbers associated with a called party; and
a computer readable medium accessible to the processor containing instructions, executable by the processor, the instructions comprising:
instructions to receive the plurality of numbers from a calling party;
instructions to receive a uniform resource identifier (URI) uniquely indicative of the called party;
instructions to place calls in response to receiving the URI, comprising:
instructions to place a call to a first number in the plurality of numbers; and
instructions to place a call to a second number in the plurality of numbers when the call to the first number is not answered.

9. The system of claim 8, wherein the plurality of numbers have an order and wherein the computer program further comprises instructions to place a call to a successive number in the plurality of numbers according to the order, when a call to a preceding number goes unanswered based on a criteria including at least one of a selected number of ring tones and the elapse of a selected time period.

10. The system of claim 8, wherein the instructions further comprise instructions to establish communications between the calling party and the called party at one of the plurality of numbers.

11. A device for placing a telephone call, comprising:
a memory for storing a plurality of numbers associated with a called party;
an interface configured to enable a user to input a uniform resource identifier (URI) for the called party; and
a processor that initiates a call to a first number in the plurality of numbers upon receiving the URI and automatically initiates a call to a second number in the plurality of numbers after a specified number of ring tones have occurred in the call to the first number.

12. The device of claim 11, wherein the processor initiates a call to each number in the plurality of numbers according to a predetermined ordering of the plurality of numbers until an answer is detected.

* * * * *